J. W. TRIMBLE.
COMBINED DISK LISTER AND PLANTER.
APPLICATION FILED NOV. 17, 1913.
1,247,744.
Patented Nov. 27, 1917.
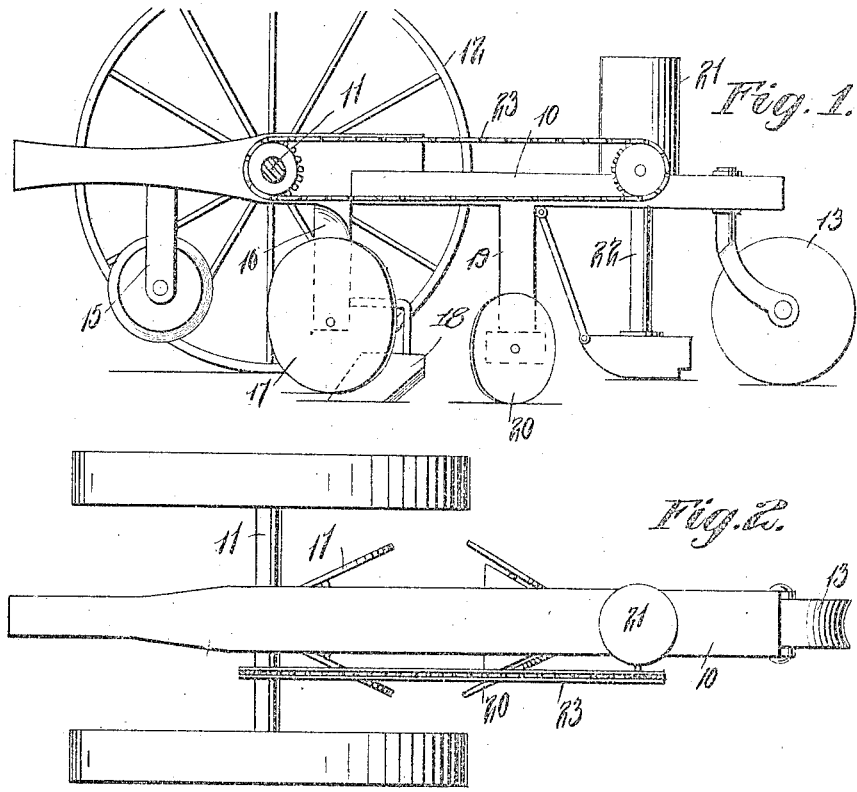
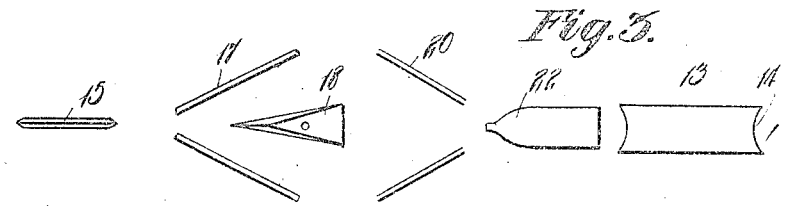
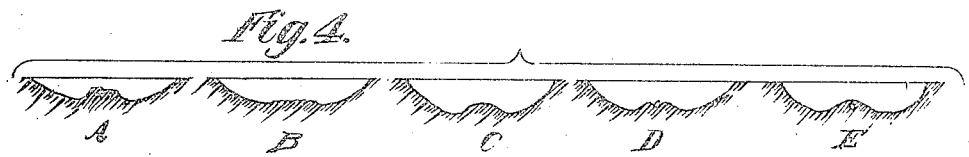
Witnesses
W. C. Fielding
Francis Boyle
Inventor
J. W. Trimble,
By
Attorney

UNITED STATES PATENT OFFICE.

JOHN W. TRIMBLE, OF AMOS, MISSOURI, ASSIGNOR OF ONE-HALF TO DEERE & COMPANY, OF MOLINE, ILLINOIS, A CORPORATION OF ILLINOIS.

COMBINED DISK LISTER AND PLANTER.

1,247,744. Specification of Letters Patent. Patented Nov. 27, 1917.

Application filed November 17, 1913. Serial No. 801,488.

*To all whom it may concern:*

Be it known that I, JOHN W. TRIMBLE, a citizen of the United States, residing at Amos, in the county of Vernon, State of Missouri, have invented certain new and useful Improvements in Combined Disk Listers and Planters; and I do hereby declare the following to be a full, clear, and exact description of the invention, such as will enable others skilled in the art to which it appertains to make and use the same.

This invention relates to combined disk listers and planters and has for an object to provide a device of this character which will prepare a more effective seed bed in advance of the planter boot than prior devices of this character.

The purpose is to provide a machine of this type which will first open a sufficiently deep listing trench or furrow, then loosen up the sub-soil along the center of the furrow bottom, then form a ridge by pulverizing the earth at the sides of the center of the trench and throwing it toward said center, then open a shallow furrow for the seed along the top of the ridge, then deliver the seed to the furrow and finally cover the seeds and pack the soil sufficiently above and around them.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention:—

Figure 1 is a side elevation of my improved machine.

Fig. 2 is a plan view.

Fig. 3 is a diagrammatic plan showing the relative location of the various ground working parts of the device.

Fig. 4 is a diagrammatic view showing the development of the seed bed.

Referring now to the drawing in which like characters of reference designate similar parts, 10 designates a beam which is supported near the front end by a turning axle 11 equipped with ground wheels 12, and is supported near the rear end by a rear ground wheel 13 the tread of which is concave as shown at 14, this wheel forming a packer wheel the operation of which will be hereinafter more fully explained.

A colter 15 is secured to the front end of the beam, and depending from the beam in rear of the axle is a hanger 16 that carries a pair of forwardly converging furrow opener disks 17 that open the furrow as shown at A in Fig. 4. Also carried on the standard between the disks is a subsoil plow 18 that operates to loosen up the subsoil of the furrow as shown at B in Fig. 4. Depending from the beam in rear of the subsoil plow is a hanger 19 that carries a pair of rearwardly convergent lister disks 20 which cut the soil from the lower concave parts of the main furrow, loosen and pulverize it and deposit it over the soil loosened by the plow 18 to produce a ridge of loose subsoil as shown at C in Fig. 4. A corn hopper 21 is carried on the beam in rear of the lister disks and communicates with a seed boot 22 which opens the top of the loose ridge of subsoil and drops the seed therein, as shown at D in Fig. 4. The seed dropping mechanism is operated by a chain drive 23 from the axle, or otherwise to drop the seed at spaced intervals apart. Finally the concaved rim of the packer wheel follows the seed boot and firmly packs down the ridge upon the dropped seed as shown at E in Fig. 4.

By following my method of acting on the soil at the bottom of the lister furrow there is formed, as shown in the diagrams in Fig. 4, a well marked longitudinally extending elevated ridge of pulverized soil in which the seeds lie, the elevation of this ridge above the horizontal plane where the curves of the main furrow walls meet remaining even after the seed has been packed. And I believe myself to be the first to have provided parts which will automatically produce a deep lister trench with such a longitudinally extended relatively elevated earth ridge in its bottom for carrying the seed.

From the above description it will be seen that the earth working parts of the device serve first to open up a sufficiently deep listing furrow, then develop an excellent seed bed, drop the seed thereinto, and finally cover over and pack the seed bed firmly upon the seed. This preparation of the seed bed has been found by experiment to result in a more uniform stand of plants than is obtainable by the use of prior devices of this type.

Of course, it will be understood that in the drawings the illustration of my mechanism is more or less conventional, and that the several operative parts, such as the standards, or carriers at 16, 19, 22, etc., are provided with the usual adjusting devices by which their positions can be varied to suit varying circumstances; and which it is not necessary to illustrate in detail.

The implement present is not one of the class which works at the surface of the soil, but, as stated, is for planting in accordance with the listing method; that is to say, a relatively deep initial furrow is opened in the bottom of which the seed is planted and which, at each of several successive cultivating stages, is partially filled until finally the soil in the furrow is brought up to the general normal surface.

I am aware that various tools have been used or proposed for surface planting having a series of soil-working parts for scraping weeds and trash away from a narrow path at the surface, then forming a seed furrow along said path and then covering the latter.

And I am also aware that implements have been proposed for listing and planting, each having rigidly held, non-rotary, sliding double moldboard bottoms or breakers.

But I believe myself to be the first to have produced a listing and planting device having parts such as are herein shown and described and constructed and arranged as set forth. The earlier mechanisms referred to which had sliding non-rotary plow bottoms or double breakers were so arranged that these sliding bottoms were dragged through the unplowed earth and the lists or trenches which are formed by them have walls or bottoms which are packed or made comparatively hard and to such extent as to prevent moisture received from the atmosphere from readily passing downward through them and also prevent the moisture in the earth below from readily rising upward to reach the roots of the plants. One of the principal objects aimed at in planting in accordance with the listing method is to insure that the moisture, both that which is initially present in the soil and that which is thereafter received, will be available for the plants. If the moisture from the air falls upon packed or hardened surfaces it is prevented from settling or percolating in the soil, and if retained upon the bottom of the trenches injures the plants and rapidly evaporates.

The disk furrow openers at 17 leave the sides and bottoms of the trenches open and porous, even where they are used to open furrows in land that has not been recently plowed. But generally, my implement is intended for use in land which has been lately plowed; and in such cases the disks leave the walls and bottoms of the furrows still more porous and permeable to water. The moisture that enters from the air immediately passes through and into the earth to a greater or lesser depth so that it is conserved for sustaining the plants at later periods. And the forming of the furrow walls and bottoms by the disks instead of by means of the sliding and packing plow bodies insures that the roots of the plants shall have a broken, loosened and porous earth-bed wherein they can develop and grow vigorously.

If the furrow opening disks 17 reach the bottom of the previously plowed top soil, the sub-soiler at 18 carries to a deeper line the breaking and pulverizing of the earth. The ridge formers 20 follow and work in vertical planes at the sides of the center of the bottom, throwing earth from the rounded parts or corner parts of the main trench toward the center, so that the broken up sub-soil is covered with some of the pulverized upper soil and a thoroughly prepared bed is ready for the seed.

What is claimed, is:—

1. An implement for forming deep lists and planting seed therein, having in combination a main frame, ground wheels supporting it, and the following devices carried thereby and arranged in series, to wit, a pair of opposed relatively large disks mounted in relation to the frame and wheels to form a deep furrow, a plow device adapted to loosen, lift up and pulverize the earth along the longitudinal center and below the surface of the bottom of the main furrow, means for cutting the soil at the bottom of the original curved furrow walls, pulverizing it and turning it over upon the soil loosened by the plow whereby a two-layer seed bed is provided, a supplemental seed furrow opener, seed delivering mechanism, and a seed covering wheel behind the delivering mechanism and adapted to roll along the bottom of the main furrow, substantially as set forth.

2. A mechanism for preparing a seed bed, and depositing and covering seed therein, in the bottom of a deep lister trench, having in combination the following parts, to wit, a frame, ground wheels, main furrow-opening disks, a plow for lifting and pulverizing the soil at the bottom of the trench, means for cutting the soil at the side parts of the bottom of the trench, pulverizing it and placing it upon the soil pulverized by said plow to form an elevated ridge along the center line of the trench, an opener adapted to form a seed furrow in the upper part of the said pulverized ridge, seed delivering mechanism, arranged to deliver the seed at a horizontal plane above the bottom and below the top of the pulverized earth, and a covering wheel having a periphery conforming to the said ridge and adapted to pack the earth upon the seed and leave it in ridge shape above the bottom of the lister furrow, substantially as set forth.

In testimony whereof, I affix my signature, in the presence of two witnesses.

JOHN W. TRIMBLE.

Witnesses:
J. H. GOODENOUGH,
J. A. LYON.